United States Patent [19]
Kenyon

[11] Patent Number: 5,934,548
[45] Date of Patent: Aug. 10, 1999

[54] REUSABLE GIFT WRAP

[76] Inventor: Cynthia Kenyon, 2362 Elbert Ave., Bellmore, N.Y. 11710

[21] Appl. No.: 09/026,294

[22] Filed: Feb. 19, 1998

[51] Int. Cl.[6] .................................................. B65D 65/10
[52] U.S. Cl. ...................... 229/87.19; 53/441; 229/116.5
[58] Field of Search .............................. 229/87.18, 87.19, 229/923, 116.5; 53/441

[56] References Cited

U.S. PATENT DOCUMENTS

| | | | |
|---|---|---|---|
| 2,071,976 | 2/1937 | Hanson | 229/87.19 |
| 2,157,193 | 5/1939 | Webber et al. | 229/87.19 |
| 3,276,671 | 10/1966 | Fleitman . | |
| 3,311,289 | 3/1967 | French . | |
| 3,366,313 | 1/1968 | Culberg et al. | 229/87.19 |
| 5,004,144 | 4/1991 | Selga | 229/87.19 |
| 5,392,983 | 2/1995 | Clarks-Bolling et al. . | |
| 5,456,062 | 10/1995 | Wecheler . | |
| 5,529,395 | 6/1996 | French . | |

Primary Examiner—Stephen P. Garbe
Attorney, Agent, or Firm—Michael I. Kroll

[57] ABSTRACT

A reusable gift wrap (12) for a gift box (14) comprising an expandable sleeve (16) longer in length than the gift box (14). The width of the expandable sleeve (16) can conform, within reasonable limits, to the width size of the gift box (14) when the gift box (14) is inserted into the expandable sleeve (16). A structure (18) is for temporarily retaining each of the two ends (20) of the expandable sleeve (16) in a folded over configuration.

14 Claims, 10 Drawing Sheets

FIG 10

REUSABLE GIFT WRAP

BACKGROUND OF THE INVENTION

1. Field of the Invention

The instant invention relates generally to package wrappers and more specifically it relates to a reusable gift wrap. The reusable gift wrap is an expandable sleeve which snugly receives a gift box, the ends are folded and retained by fasteners, while a ribbon attached to the sleeve can be tied thereabout into a bow.

The sleeve is preferably formed of a decorative fabric, mylar or the like. A narrow strip of elastic material extends the length of the sleeve, joining the opposed lateral edges of the wrap material to form the closed sleeve. The elastic material allows the width of the sleeve to conform, within reasonable limits, to the size of a gift box inserted into the sleeve, allowing the sleeve to contract around the gift box to form a tight wrap. The ends of the sleeve are provided with a ribbon, which is wrapped around the gift box when the ends of the sleeve are folded about the inserted gift box, to provide a finished appearance and to hold the folded ends of the sleeve. As a further feature, the fasteners are located at the ends of the sleeve, allow them to be retained in the folded-over configuration as the ribbon is being tied. In a preferred embodiment, the adhesive is a tab formed from one element of a hook and loop fastener. The other element is the elastic strip material. Use of such a combination has the added benefit of allowing adhesion of the sleeve ends to occur at any location along the entire length of the elastic strip, thus facilitating folding the ends of the wrap about the gift box irrespective of the length of the gift box.

2. Description of the Prior Art

Numerous package wrappers have been provided in prior art. For example, U.S. Pat. Nos. 3,276,671 to Fleitman; 3,311,289 to French; 5,392,983 to Clarke-Bolling et al.; 5,456,062 to Wechsler and 5,529,395 to French all are illustrative of such prior art. While these units may be suitable for the particular purpose to which they address, they would not be as suitable for the purposes of the present invention as heretofore described.

FLEITMAN, DENNIS L.

PAPER WRAPPING HAVING STRETCHABLE INSERT

U.S. Pat. No. 3,276,671

A paper bag for commodities such as mattresses, inner and box springs, metal and fiber cans, plywood sheets, wall board and acoustical tiles. The bag is adapted to absorb applied shock and impact without failure. The bag comprises a ring of walls formed of non-stretchable flexible paper. The bag has an open mouth and a closed bottom. One wall has a slot therein running the entire length of the bag from the mouth to the bottom thereof. An elongated linear stretchable insert formed from imperforate sheet material is integral with the container, bridging the slot and running coincident with the slot. The width of the insert constitutes between about 5% and about 35% of the width of the wall of the bag in which it is located. The insert is formed from a synthetic resin film having an elongation and direction of stretch girthwise of the bag of from about 60% to about 600%.

FRENCH, PAUL

PREFABRICATED WRAPPER FOR CONTAINERS

U.S. Pat. No. 3,311,289

The present invention is designed to overcome the limitation that is attendant upon the gift wrapping of boxes, particularly rectangular boxes. Toward this end, the invention contemplates the provision of a novel preformed wrapper which is in the form of a flattened tube of flexible and preferably decorative sheet stock. The martial of the tube is provided with score or crease lines, which are commensurate with the rectangular outlines of the particular box to be gift wrapped. When the box is inserted within the tube the latter may be folded upon the box in such a manner that all of the score lines will coincide with the longitudinal and transverse edges of the box. This enhances the appearance of the gift wrapped package in that the side faces of the completed package will be entirely devoid of longitudinal, transverse or diagonal score or crease lines.

CLARKE-BOLLING, PATRICIA

WILL, DEBRA

REUSABLE GIFT WRAP

U.S. Pat. No. 5,392,983

The invention relates to a reusable fabric gift wrapping, which wrapping is complete in itself, requiring no additional materials such as separate fastening or adhesive means, and which accommodates a variety of box sizes and shapes. The reusable gift wrapping comprises a washable fabric sheet which is secured during wrapping by means of a resealable adhesive coating.

WECHSLER, LANA

DECORATIVE PACKAGE WRAP

U.S. Pat. No. 5,456,062

A decorative gift wrap for wrapping a package comprising an elongated enclosure formed of a length of stretchable hosiery netting with a closure on each end of the netting enclosure. The netting enclosure can be stretched to allow a package to be inserted therein and both ends of the netting enclosure closed to create a formfitting decorative wrap for the package. The closure on at least one end is selectively openable to remove the package.

FRENCH, JUDITH A.

STRETCHABLE GIFT WRAPPING WITH SELF FORMING BOW

U.S. Pat. No. 5,529,395

A reusable gift wrapping having an adjustable main body that conforms to the size of a gift item to be covered. This main body is fabricated from a stretchable and flexible material (e.g. spandex), and it includes an interior surface and a decorative exterior surface. When the gift item is placed on the interior surface, the main body can be wrapped around the gift item to entirely enclose it within the main body. A decorative trim is attached to the circumference of the main body, and is a self forming bow that substantially conceals the circumferential edge of the main body when the main body is encircling the gift item. A draw string is either woven through the edge of the main body of the gift wrapping or is inserted in and through a sleeve provided by a hem sewn in the edge of the gift wrapping main body.

SUMMARY OF THE INVENTION

A primary object of the present invention is to provide a reusable gift wrap that will overcome the shortcomings of the prior art devices.

Another object is to provide a reusable gift wrap that is an expandable sleeve, which will snugly receive a gift box, whereby the ends of the sleeve can be folded over and retained thereto by fasteners, while a ribbon attached to the sleeve can be wrapped thereabout and tied into a bow.

An additional object is to provide a reusable gift wrap in which the expandable sleeve has a narrow strip of elastic material extending the length thereof, so that the fasteners each being one VELCRO tab, can engage with the narrow strip of elastic material at any location along its length, thus facilitating folding the ends of the sleeve about the gift box irrespective of the length of the gift box.

A still additional object is to provide a reusable gift wrap that is complete in itself, requiring no additional fastening means or special tools, like a scissors to make the wrap, while the expandable sleeve eliminates one less step in wrapping the gift box.

Another additional object is to provide a reusable gift wrap that is made out of a long lasting fabric material and being combined with the VELCRO tabs make it machine washable, so that it can be used many times.

A further object is to provide a reusable gift wrap that is simple and easy to use.

A still further object is to provide a reusable gift wrap that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, FIGS. 1 through 10 illustrate the instant invention being a reusable gift wrap 12. With regard to the reference numerals used, the following numbering is used throughout the various drawing figures.

12 reusable gift wrap
14 gift box
16 expandable sleeve of 12
18 temporary retaining structure of 12
20 end of 16
22 pliable sheet of 16
24 narrow elastic strip of 16
26 fabric material for 22
28 elastomeric material for 24
30 VELCRO tab of 18
32 inner surface of 22 at 20
34 elongate ribbon of 18
36 outer surface of 22
37 bow of 34
38 long and narrow piece of cloth material for 34
40 stitches of thread The reusable gift wrap 12 is for a gift box 14 and comprises an expandable sleeve 16 longer in length than the gift box 14. The width of the expandable sleeve 16 can conform, within reasonable limits, to the width size of the gift box 14 when the gift box 14 is inserted into the expandable sleeve 16. A structure 18 is for temporarily retaining each of the two ends 20 of the expandable sleeve 16, in a folded over configuration.

The expandable sleeve 16 consists of a pliable sheet 22. A narrow elastic strip 24 is attached at opposite sides to opposite edges of the pliable sheet 22, which extends the length of the expandable sleeve 16 on the bottom thereof. The pliable sheet 22 is fabricated out of a fabric material 26. The pliable sheet 22 can include a decorative pattern thereon, so as to enhance the appearance thereof. The narrow elastic strip 24 is fabricated out of an elastomeric material 28.

The temporary retaining structure 18 comprises two VELCRO tabs 30. Each VELCRO tab 30 is affixed onto an inner surface 32 of one end 20 of the pliable sheet 22 of the expandable sleeve 16. When each end 20 is in its folded over configuration, the respective VELCRO tab 30 will engage with and stick to the narrow elastic strip 24 at any location along its length, thus facilitating folding the ends 20 of the expandable sleeve 16 about the gift box 14 irrespective of the length of the gift box 14. The VELCRO tab 30 can be either a hook or loop type fabric fastener, while the narrow elastic strip 24 will function as an opposite one of the hook or loop type fabric fastener.

Figure 1:
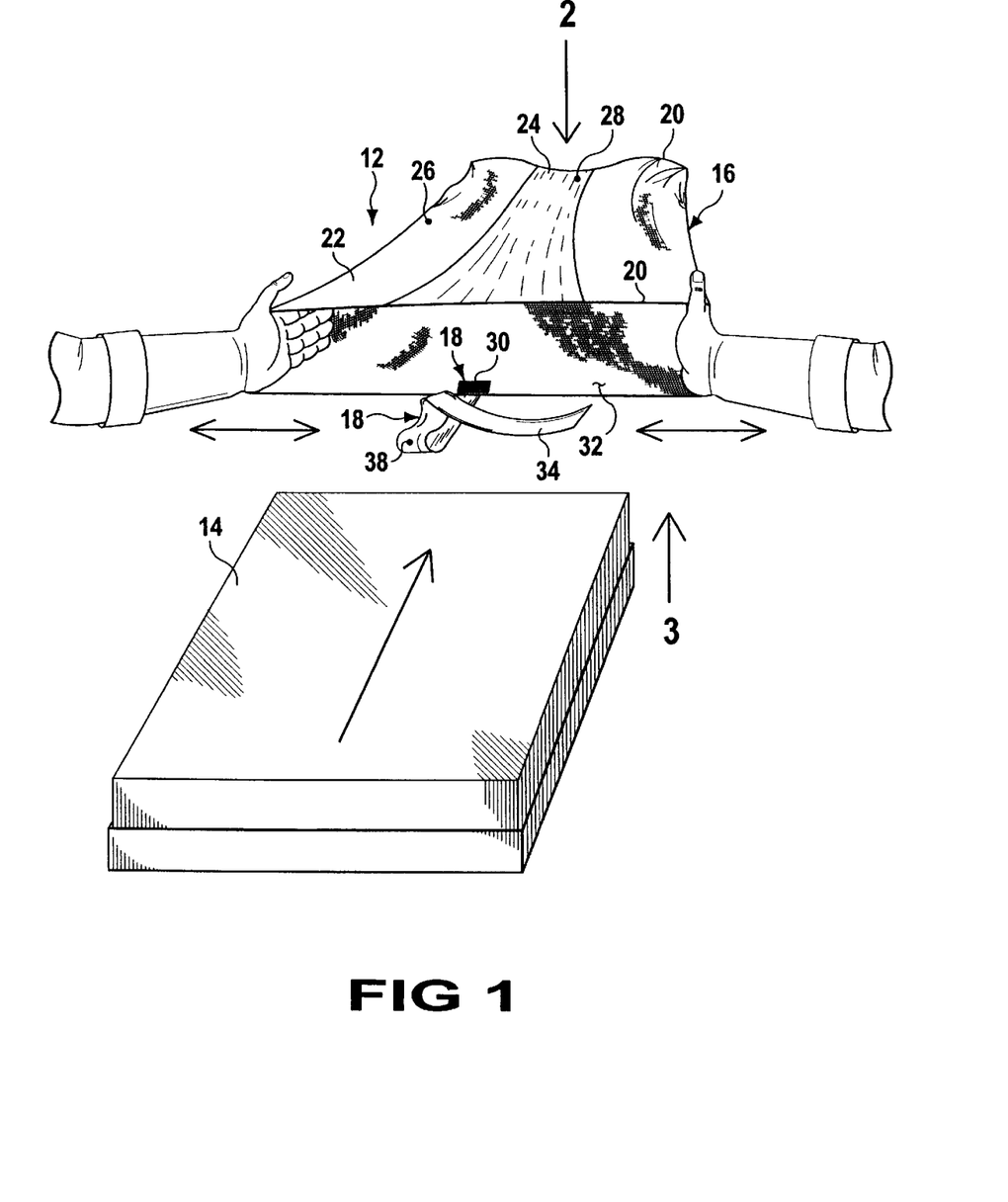
FIG. 1 is a bottom perspective view showing a gift box ready to be inserted into the instant invention.
Figure 2:
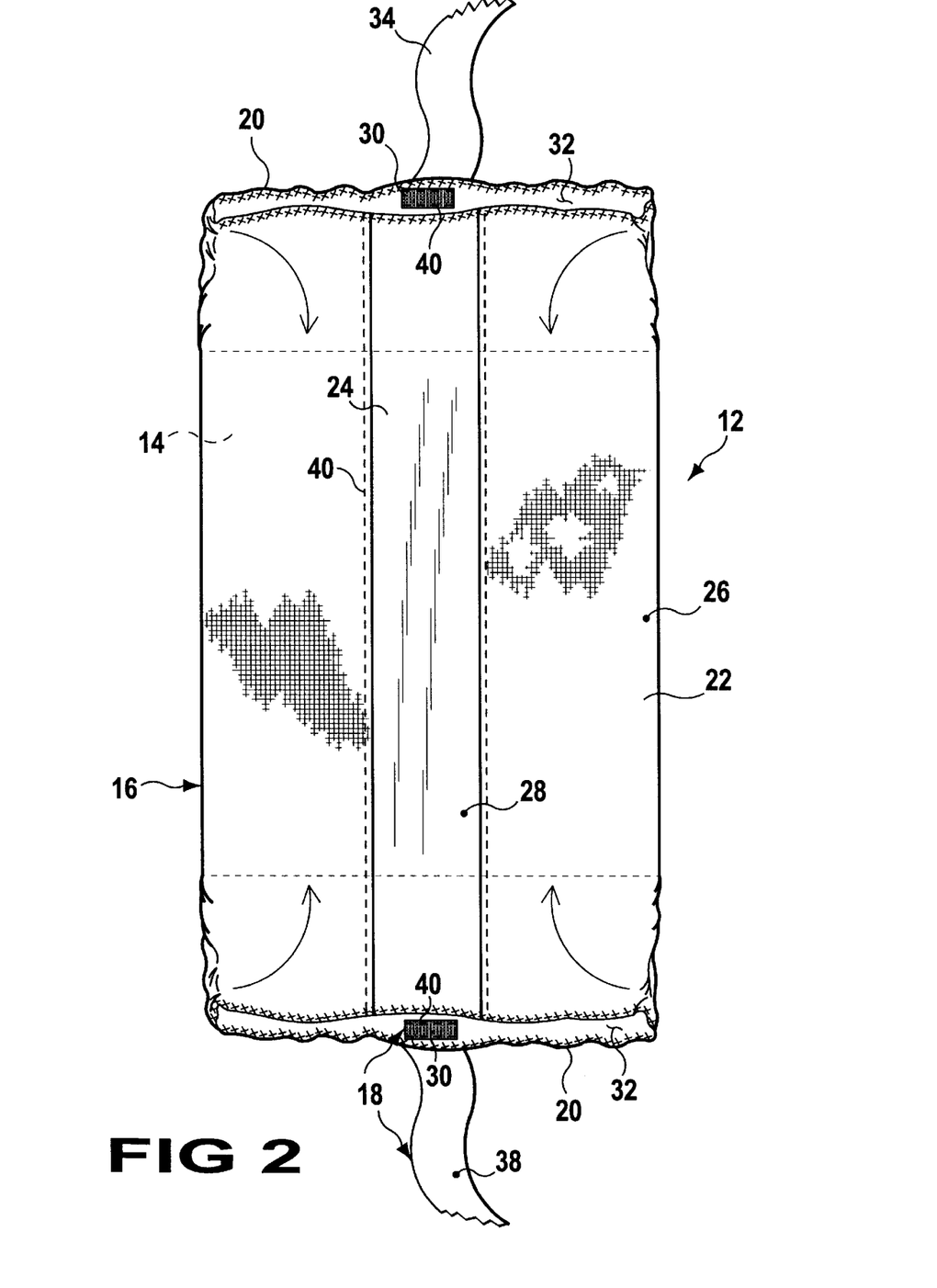
FIG. 2 is a bottom plan view taken in the direction of arrow 2 in FIG. 1, with the ribbon broken away and the gift box inserted therein.
Figure 3:
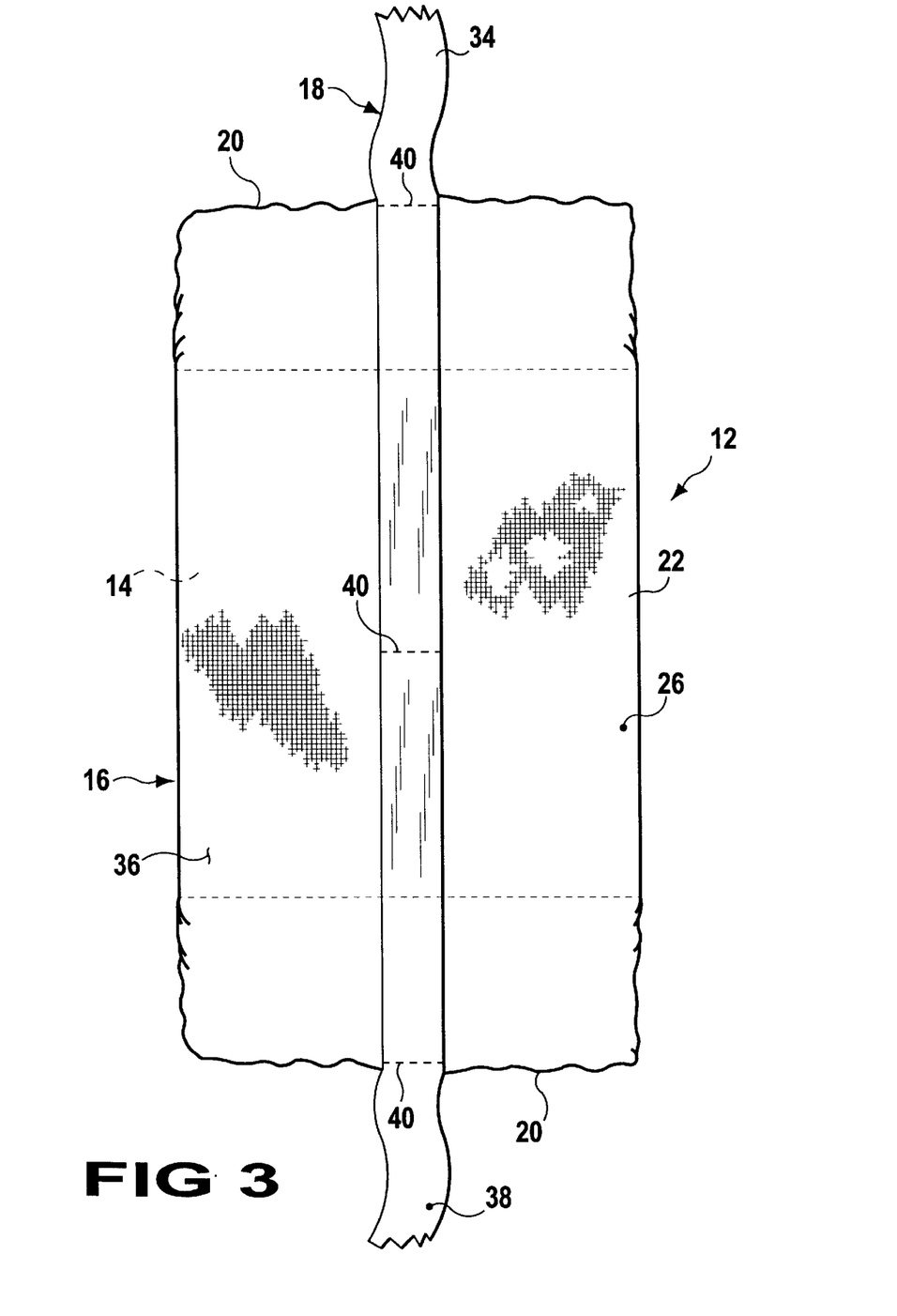
FIG. 3 is a top plan view taken in the direction of arrow 3 in FIG. 1, with the ribbon broken away and the gift box inserted therein.
Figure 4:
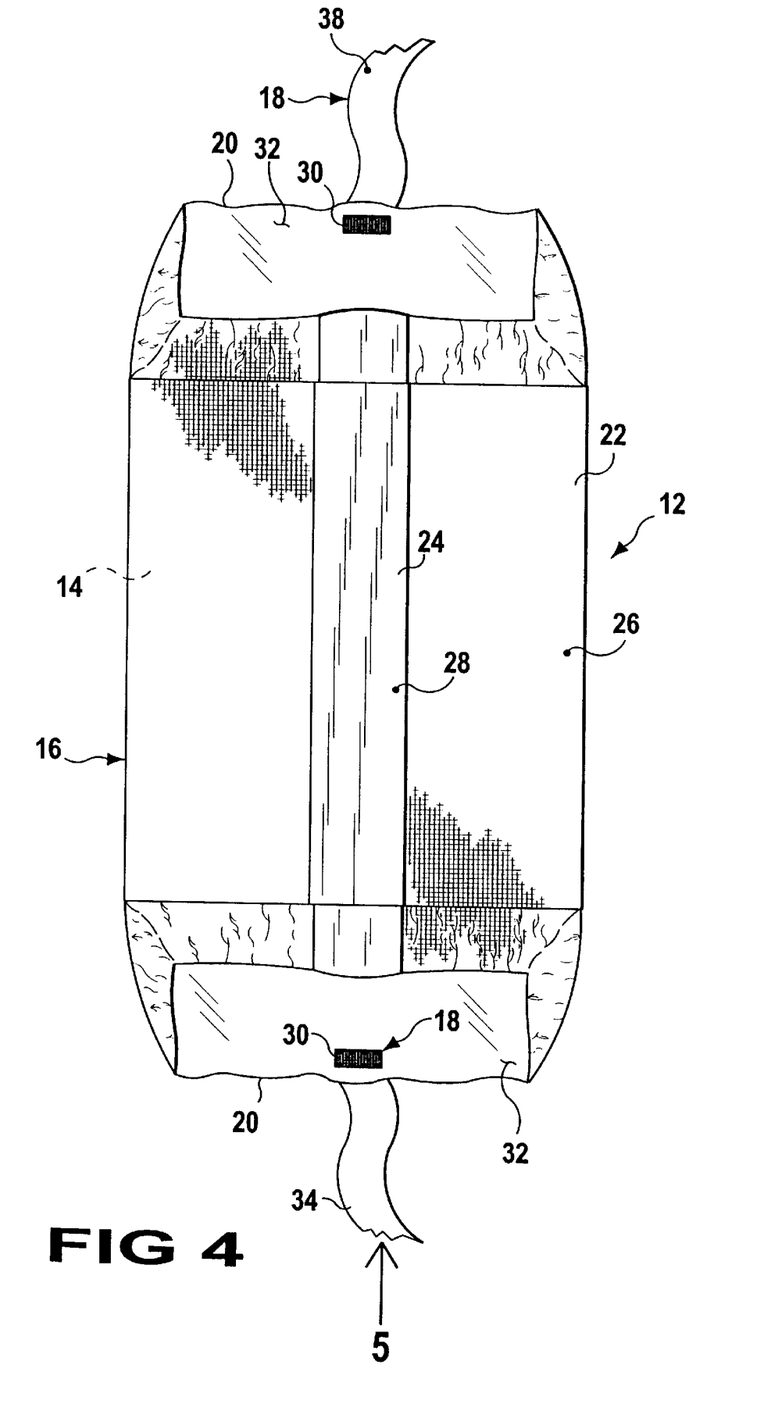
FIG. 4 is a bottom plan view similar to FIG. 2, showing the ends partially folded closed.
Figure 5:
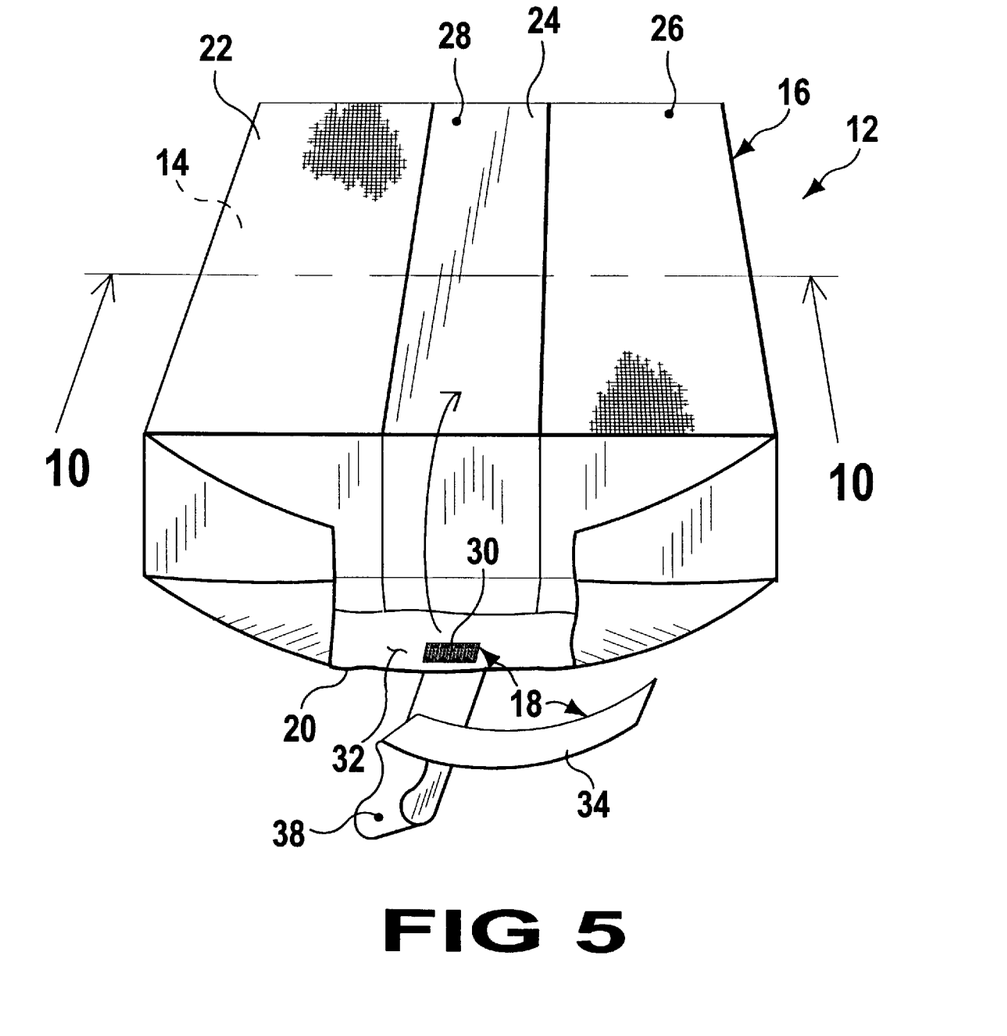
FIG. 5 is a bottom perspective view taken in the direction of arrow 5 in FIG. 4.
Figure 6:
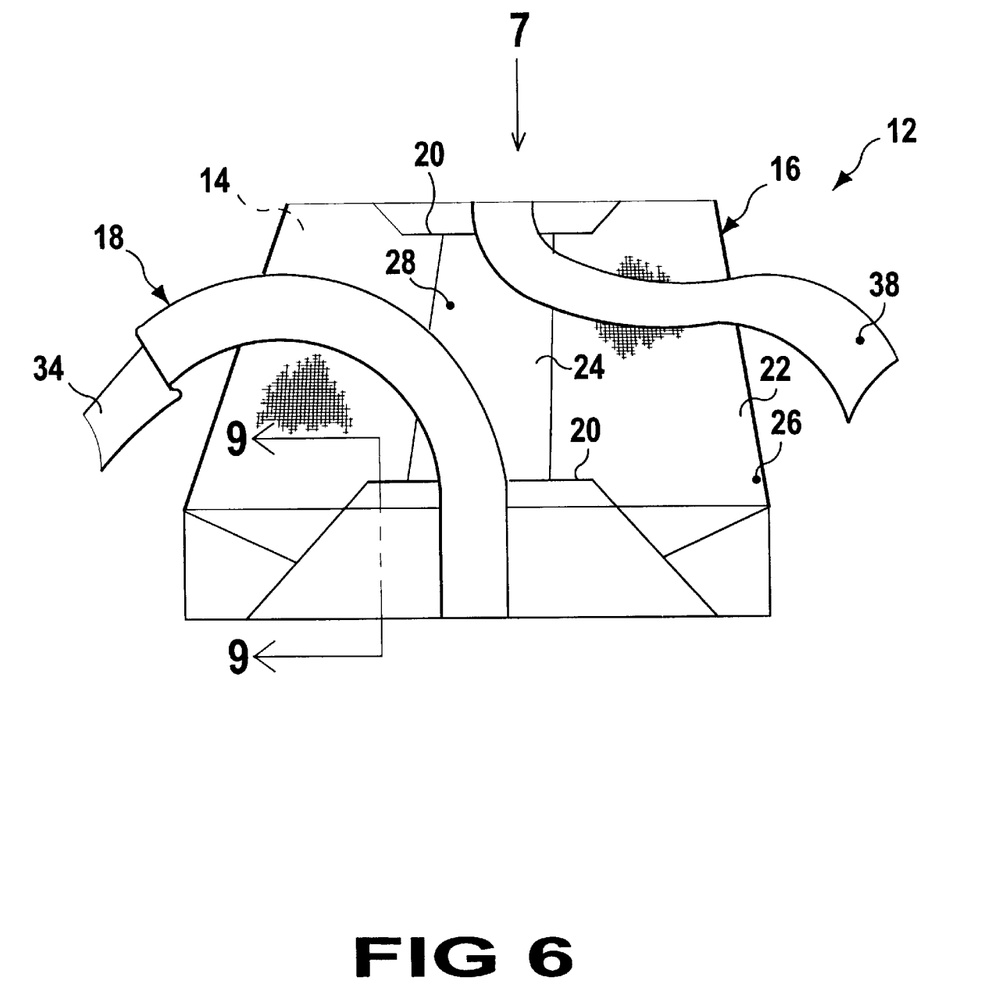
FIG. 6 is a bottom perspective view similar to FIG. 5, showing the ends folded closed tightly and held by the VELCRO tabs.
Figure 7:
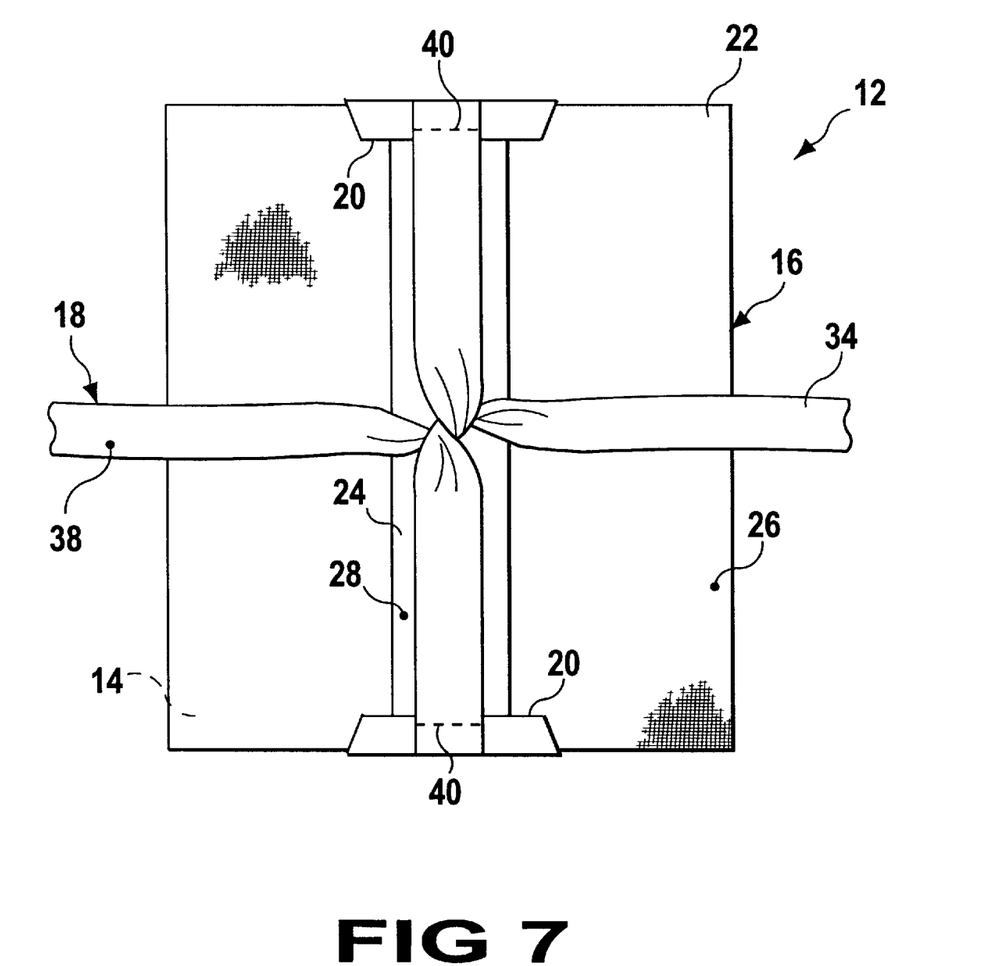
FIG. 7 is a bottom plan view taken in the direction of arrow 7 in FIG. 6, showing the ribbon broken away and crossed over at the center.
Figure 8:
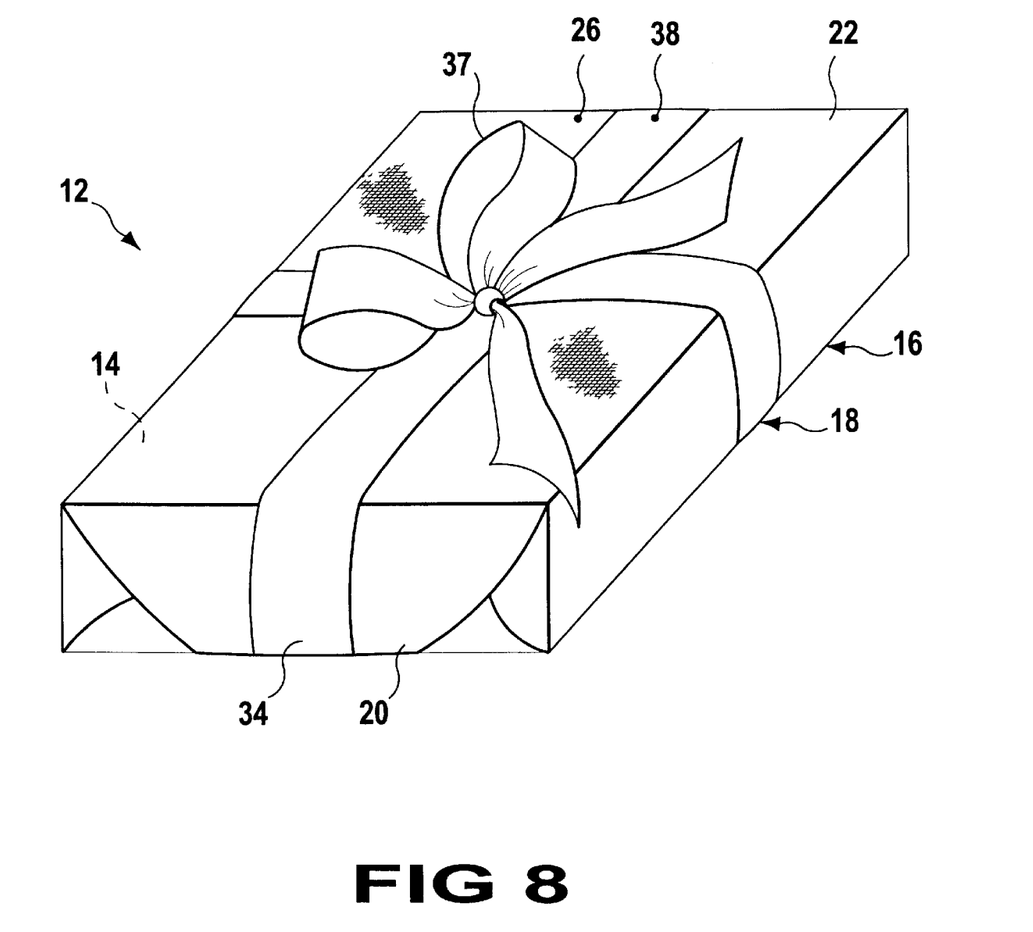
FIG. 8 is a top perspective view, showing the ribbon tied into a bow.
Figure 9:
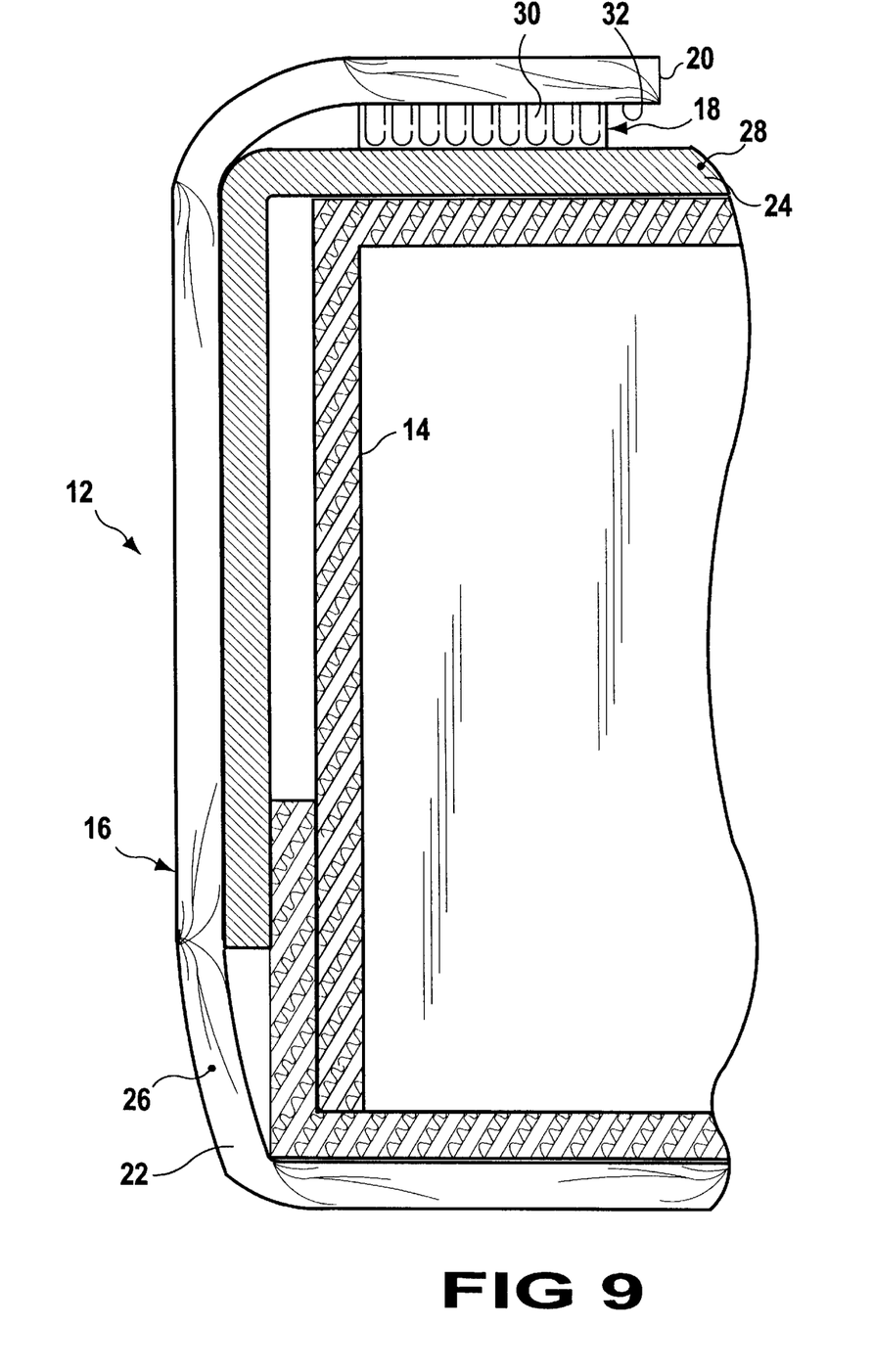
FIG. 9 is an enlarged cross sectional view of a portion thereof taken along line 9—9 in FIG. 6.
Figure 10:
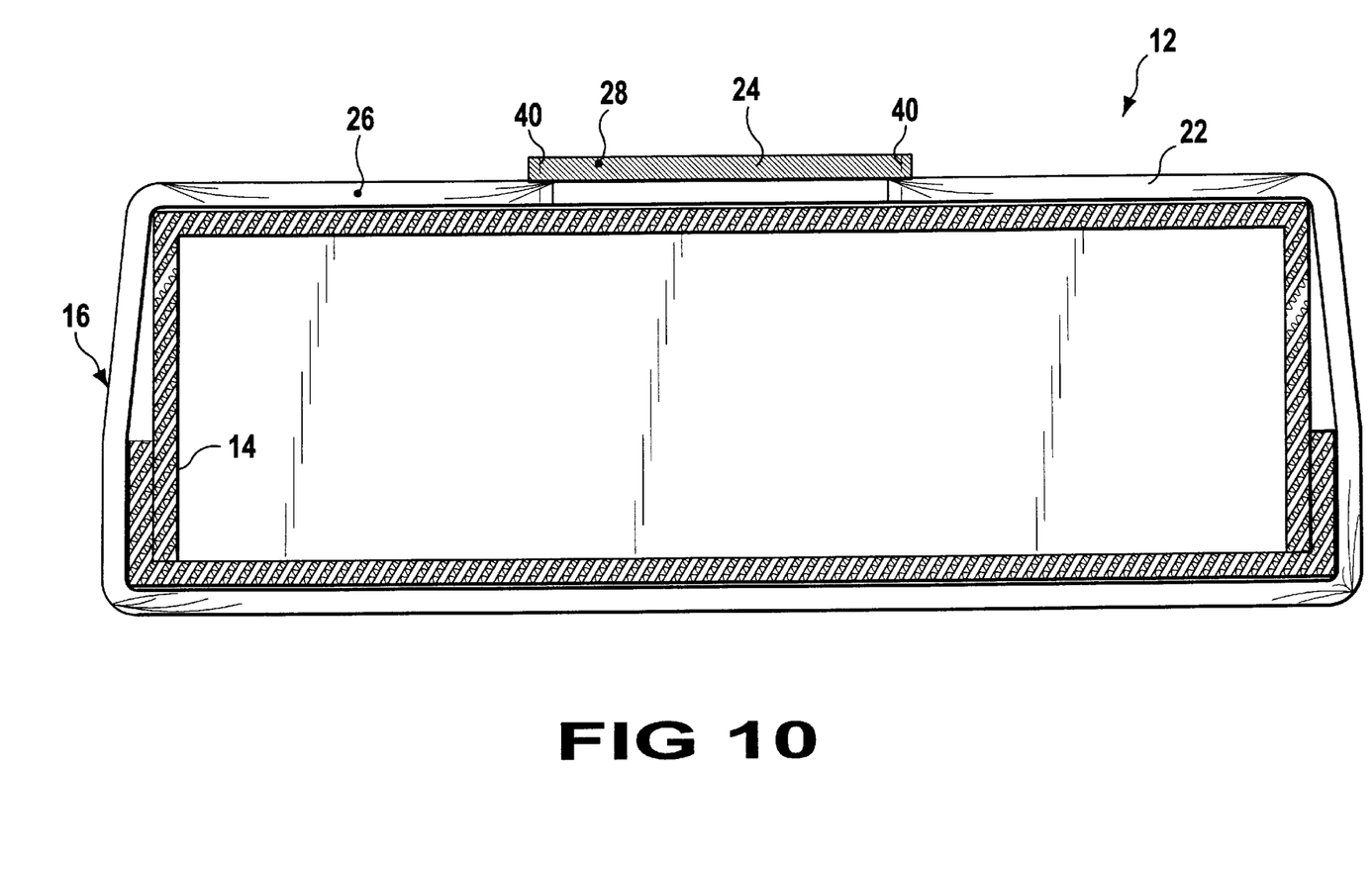
FIG. 10 is an enlarged cross sectional view taken along line 10—10 in FIG. 5.

The temporary retaining structure 18 further includes an elongate ribbon 34 fastened onto an outer surface 36 of the pliable sheet 22 of the expandable sleeve 16 along the length thereof opposite from the narrow elastic strip 24. After the gift box 14 is inserted and the ends 20 of the expandable sleeve 16 are in the folded over configuration, the elongate ribbon 34 can be crossed over at the center, wrapped about the width of the expandable sleeve 16 and tied into a bow 37, as shown in FIGS. 7 and 8.

The elongate ribbon 34 is a relatively long and narrow piece of cloth material 38. The narrow elastic strip 24, the VELCRO tabs 30 and the elongate ribbon 34 can all be attached to the pliable sheet 22 with stitches of thread 40, as shown in FIGS. 2, 3, 7 and 10.

OPERATION OF THE INVENTION

To use the reusable gift wrap 12, the following steps should be taken:

1. Form the expandable sleeve 16 to be longer in length than the gift box 14.
2. Stretch the expandable sleeve 16, so that the gift box 14 can be inserted through one end 20 of the expandable sleeve 16, whereby the width of the expandable sleeve 16 can conform, within reasonable limits to the width size of the gift box 14.
3. Fold over each of the two ends 20 of the expandable sleeve 16.
4. Retain each of the two ends 20 of the expandable sleeve 16 in a temporary manner with the VELCRO tabs 30 and elongate ribbon 34 when in the folded over configuration.

To form the expandable sleeve 16, the following steps should be taken:

1. Use the pliable sheet 22 fabricated out of the decorative fabric material 26.
2. Attach opposite sides of the narrow elastic strip 24 made out of the elastomeric material 28 to opposite edges of the pliable sheet 22, which extends the length of the expandable sleeve 16 on the bottom thereof.

To retain each of the two ends 20 of the expandable sleeve 16, the following steps should be taken:

1. Affix a VELCRO tab 30 onto the inner surface 32 of each end 20 of the pliable sheet 22 of the expandable sleeve 16, so that when each end 20 is in its folded over configuration, the respective VELCRO tab 30 will engage with and stick to the narrow elastic strip 24 at any location along its length, thus facilitating folding the ends 20 of the expandable sleeve 16 about the gift box 14 irrespective of the length of the gift box 14.
2. Fasten the elongate ribbon 34, being the relatively long and narrow piece of cloth material 38, onto the outer surface 36 of the pliable sheet 22 of the expandable sleeve 16 along the length there of opposite from the narrow elastic strip 24, so that after the gift box 14 is inserted and the ends 20 of the expandable sleeve 16 are in the folded over configuration, the elongate ribbon 34 can be crossed over at the center, wrapped about the width of the expandable sleeve 16 and tied into the bow 37.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A reusable gift wrap for a gift box comprising:
   a) an expandable sleeve longer in length than the gift box, whereby the width of said expandable sleeve can conform, within reasonable limits, to the width size of the gift box when the gift box is inserted into said expandable sleeve, wherein said expandable sleeve includes a pliable sheet and a narrow elastic strip attached at opposite sides to opposite edges of said pliable sheet, which extends the length of said expandable sleeve on the bottom thereof; and
   b) means for temporarily retaining each of the two ends of said expandable sleeve, in a folded over configuration.
2. A reusable gift wrap as recited in claim 1, wherein said pliable sheet includes a decorative pattern thereon, so as to enhance the appearance thereof.
3. A reusable gift wrap as recited in claim 1, wherein said narrow elastic strip is fabricated out of an elastomeric material.
4. A reusable gift wrap as recited in claim 1, wherein said temporary retaining means further includes an elongate ribbon fastened onto an outer surface of said pliable sheet of said expandable sleeve along the length thereof opposite from said narrow elastic strip, so that after the gift box is inserted and the ends of said expandable sleeve are in the folded over configuration, said elongate ribbon can be crossed over at the center, wrapped about the width of said expandable sleeve and tied into a bow.
5. A reusable gift wrap as recited in claim 4, wherein said elongate ribbon is a relatively long and narrow piece of cloth material.
6. A reusable gift wrap as recited in claim 1, wherein said pliable sheet is fabricated out of a fabric material.
7. A reusable gift wrap as recited in claim 6, wherein said pliable sheet includes a decorative pattern thereon, so as to enhance the appearance thereof.
8. A reusable gift wrap as recited in claim 7, wherein said narrow elastic strip is fabricated out of an elastomeric material.
9. A reusable gift wrap as recited in claim 8, wherein said temporary retaining means includes two hook and loop fastener tabs, whereby each said hook and loop fastener tab is affixed onto an inner surface of one end of said pliable sheet of said expandable sleeve, so that when each end is in its folded over configuration, said respective hook and loop fastener tab will engage with and stick to said narrow elastic strip at any location along its length, thus facilitating folding the ends of said expandable sleeve about the gift box irrespective of the length of the gift box.
10. A reusable gift wrap as recited in claim 9, wherein said temporary retaining means further includes an elongate ribbon fastened onto an outer surface of said pliable sheet of said expandable sleeve along the length thereof opposite from said narrow elastic strip, so that after the gift box is inserted and the ends of said expandable sleeve are in the folded over configuration, said elongate ribbon can be crossed over at the center, wrapped about the width of said expandable sleeve and tied into a bow.
11. A reusable gift wrap as recited in claim 10, wherein said elongate ribbon is a relatively long and narrow piece of cloth material.

12. A reusable gift wrap as recited in claim 1, wherein said temporary retaining means includes two hook and loop fastener tabs, whereby each said hook and loop fastener tab is affixed onto an inner surface of one end of said pliable sheet of said expandable sleeve, so that when each end is in its folded over configuration, said respective hook and loop fastener tab will engage with and stick to said narrow elastic strip at any location along its length, thus facilitating folding the ends of said expandable sleeve about the gift box irrespective of the length of the gift box.

13. A method of gift wrapping a gift box in a reusable manner comprising the steps of:

a) forming an expandable sleeve longer in length than the gift box, wherein the step of forming said expandable sleeve further comprises the steps of:
   i) using a pliable sheet fabricated out of a decorative fabric material; and
   ii) attaching opposite sides of a narrow elastic strip made out of an elastomeric material to opposite edges of said pliable sheet, which extends the length of said expandable sleeve on the bottom thereof;

b) stretching said expandable sleeve, so that the gift box can be inserted through one end of said expandable sleeve, whereby the width of said expandable sleeve can conform, within reasonable limits to the width size of the gift box;

c) folding over each of the two ends of said expandable sleeve; and d) retaining each of the two ends of said expandable sleeve in a temporary manner when in the folded over configuration.

14. A method as recited in claim 13, wherein the step of retaining each of the two ends of said expandable sleeve further comprises the steps of:

a) affixing a hook and loop fastener tab onto an inner surface of each end of said pliable sheet of said expandable sleeve, so that when each end is in its folded over configuration said respective hook and loop fastener tab will engage with and stick to said narrow elastic strip at any location along its length, thus facilitating folding the ends of said expandable sleeve about the gift box irrespective of the length of the gift box; and b) fastening an elongate ribbon, being a relatively long and narrow piece of cloth material, onto an outer surface of said pliable sheet of said expandable sleeve along the length thereof opposite from said narrow elastic strip, so that after the gift box is inserted and the ends of said expandable sleeve are in the folded over configuration, said elongate ribbon can be crossed over at the center, wrapped about the width of said expandable sleeve and tied into a bow.

* * * * *